(12) United States Patent
Sato et al.

(10) Patent No.: US 8,163,866 B2
(45) Date of Patent: Apr. 24, 2012

(54) AROMATIC POLYESTER RESIN COMPOSITION

(75) Inventors: Hiroyuki Sato, Iwaki (JP); Kazuyuki Yamane, Iwaki (JP); Yuki Hokari, Nagoya (JP); Fuminori Kobayashi, Iwaki (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/449,093

(22) PCT Filed: Jan. 22, 2008

(86) PCT No.: PCT/JP2008/050768
§ 371 (c)(1),
(2), (4) Date: Jan. 7, 2011

(87) PCT Pub. No.: WO2008/090867
PCT Pub. Date: Jul. 31, 2008

(65) Prior Publication Data
US 2011/0105699 A1   May 5, 2011

(51) Int. Cl.
*C08G 63/86* (2006.01)
*C08G 63/06* (2006.01)
*C08K 5/22* (2006.01)
*C08K 5/49* (2006.01)

(52) U.S. Cl. ........ 528/357; 528/283; 528/285; 524/115; 524/189

(58) Field of Classification Search ............ 524/115, 524/210, 189; 528/283, 285, 357
See application file for complete search history.

(56) References Cited

U.S. PATENT DOCUMENTS

| | | | |
|---|---|---|---|
| 4,565,851 A | | 1/1986 | Barbee |
| 4,729,927 A * | | 3/1988 | Hirose et al. ............. 428/480 |
| 6,455,665 B1 * | | 9/2002 | Barnette et al. ........... 528/272 |
| 6,590,044 B2 * | | 7/2003 | Suzuki et al. ............. 525/437 |
| 6,951,956 B2 * | | 10/2005 | Yamane et al. ............ 562/587 |
| 7,358,324 B2 * | | 4/2008 | Chen et al. ............... 528/288 |
| 2006/0051398 A1 * | | 3/2006 | Andjelic et al. ........... 424/424 |
| 2007/0129501 A1 * | | 6/2007 | Chen et al. .............. 525/329.4 |

FOREIGN PATENT DOCUMENTS

| | | |
|---|---|---|
| JP | 10-060136 | 3/1998 |
| JP | 11-106496 | 4/1999 |
| JP | 2001-172488 | 6/2001 |
| JP | 2003-040990 | 2/2003 |
| JP | 2004-018730 | 1/2004 |
| JP | 2004-231953 | 8/2004 |
| JP | 2004-359909 | 12/2004 |
| JP | 2005-200516 | 7/2005 |

* cited by examiner

*Primary Examiner* — Tae H Yoon
(74) *Attorney, Agent, or Firm* — Wenderoth, Lind & Ponack, L.L.P.

(57) ABSTRACT

An aromatic polyester resin composition, including: a melt-kneaded product of 99-70 wt. parts of an aromatic polyester resin and 1-30 wt. parts (providing a total of 100 wt. parts together with the aromatic polyester resin) of a polyglycolic acid resin, wherein the aromatic polyester resin is an aromatic polyester resin polymerized with a germanium compound (catalyst), and the polyglycolic acid resin is a polyglycolic acid resin obtained by ring-opening polymerization of glycolide. As a result, gas generation during the melt-processing of a composition obtained by adding a relatively small amount of polyglycolic acid resin to an aromatic polyester resin is effectively suppressed to provide an aromatic polyester resin composition with a good gas-barrier property.

4 Claims, No Drawings

AROMATIC POLYESTER RESIN COMPOSITION

This application is the United States national stage of International Application No. PCT/JP2008/050768, filed Jan. 22, 2008, which was published under PCT Article 21 in Japanese as International Publication No. WO 2008/090867, and which claims benefit of Japanese Patent Application No. 2007-011808 filed Jan. 22, 2007 and the text of application 2007-011808 is incorporated by reference in its entirety herewith.

TECHNICAL FIELD

The present invention relates to an improvement of an aromatic polyester resin composition provided with an improved gas-barrier property by addition of a polyglycolic acid resin, more specifically to a resin composition with a reduced gas generation during melt-processing of an aromatic polyester resin and a polyglycolic acid resin.

BACKGROUND ART

Aromatic polyester resins, as represented by polyethylene terephthalate, are excellent in shapability, mechanical properties, transparency, etc. and are widely used as a packaging material for various foods and containers for beverages, etc. However, as a packaging material, particularly for foods to be stored for a long period, the gas-barrier property of an aromatic polyester resin is not sufficient so that the deterioration of contents has been inevitable.

On the other hand, polyglycolic acid resin is known to have particularly excellent gas-barrier property in addition to heat resistance and mechanical strength (e.g., Patent document 1 listed below), and it has been proposed to add a small amount thereof to an aromatic polyester resin to provide an aromatic polyester resin composition improved in gas-barrier property of the latter (Patent documents 2 and 3). However, an aromatic polyester resin having ordinarily a melting point of at least 240° C. and a polyglycolic acid resin having a melting point of ca. 200° C. do not necessarily have good mutual solubility, and for obtaining a uniform mixture of these resins, it is necessary to effect melt-kneading at a temperature exceeding the melting points of both resins. During such melt-kneading and the melt-forming of the resultant mixture composition, a considerable amount of gas generation was observed, and there have arisen serious problems in commercial production of an aromatic polyester resin/polyglycolic acid resin mixture composition, such as deterioration of environments for melt-processing operations including such melt-kneading and melt-forming, and soiling of the processing apparatus and the product after the processing with the condensed and attached gas components.
Patent document 1: JP-A 10-60136
Patent document 2: U.S. Pat. No. 4,565,851
Patent document 3: JP-A 2005-200516.

DISCLOSURE OF INVENTION

Accordingly, a principal object of the present invention is to provide an aromatic polyester resin composition having a good gas-barrier property and suppressing gas generation during the melt-processing of a composition obtained by adding a relatively small amount of polyglycolic acid resin to an aromatic polyester resin.

Having been developed to accomplish the above-mentioned object, the aromatic polyester resin composition of the present invention comprises: a melt-kneaded product of 99-70 wt. parts of an aromatic polyester resin and 1-30 wt. parts (providing a total of 100 wt. parts together with the aromatic polyester resin) of a polyglycolic acid resin, wherein the aromatic polyester resin is an aromatic polyester resin polymerized with a germanium compound (catalyst), and the polyglycolic acid resin is a polyglycolic acid resin obtained by ring-opening polymerization of glycolide.

A history through which the present inventors have arrived at the present invention as a result of study with the above-mentioned object, will be briefly described.

As a result of analysis of gas components occurring during the melt-processing of an aromatic polyester resin and a polyglycolic acid resin and condensates thereof attached to the melt-processing apparatus, they were confirmed to be principally composed of glycolide which is a cyclic dimer of glycolic acid. The occurrence of glycolide during hot melt-processing was also found in melt-processing of polyglycolic acid resin alone, and the present inventors had knowledge that glycolide was generated by de-polymerization from a terminal hydroxyl group of polyglycolic acid, and the amount of the terminal hydroxyl group was increased along with a molecular weight decrease by hydrolysis of polyglycolic acid in the co-presence of trace water catalyzed by carboxylic group on the opposite terminal. Accordingly, compared with a polycondensation-type polyglycolic acid resin formed by polycondensation of glycolic acid which is inevitably accompanied with remaining of the terminal hydroxyl group and carboxyl group concentrations, it is remarkably preferred to use a ring-opening polymerization-type polyglycolic acid resin accompanied with little formation of such terminal groups. Further, compared with the polyglycolic acid resin obtained through polycondensation provided with a weight-average molecular weight of ca. 50,000 at the most, the ring-opening polymerization-type polyglycolic acid resin is preferred also because it can be easily provided with ordinarily on the order of 200,000 to retain a high mechanical strength when it is added to an aromatic polyester resin. However, even when such a ring-opening polymerization-type polyglycolic acid resin was added, the occurrence of glycolide during the melt-processing together with an aromatic polyester resin was unexpectedly much larger compared with the level during the melt-processing of polyglycolic acid resin alone. Accordingly, the cause of the occurrence of such a large amount of glycolide had to be sought in an interaction with the aromatic polyester resin as a larger-quantity component. As a result of further study, it was assumed that a polymerization catalyst used in the aromatic polyester resin as the larger-quantity component functioned as a co-catalyst for the glycolide gas-generation. As the polycondensation catalysts for aromatic polyester resins, there have been generally used antimony compounds, germanium compounds, tin compounds, zinc compounds, aluminum compounds, titanium compounds, etc., among which a germanium compound was found to show less co-catalyst function for the above-mentioned glycolide gas-generation. Therefore, an aromatic polyester resin obtained with a germanium compound (catalyst) and a ring-opening polymerization-type polyglycolic acid resin were combined, whereby it was confirmed possible to provide an aromatic polyester resin composition with improved gas-barrier property, good mechanical strength and remarkably reduced residual glycolide content while remarkably suppressing the glycolide gas-generation, thus arriving at the present invention.

BEST MODE FOR PRACTICING THE INVENTION

Aromatic Polyester Resin

The resin composition of the present invention contains, as a principal resin component, an aromatic polyester resin, specific examples of which may include: polyethylene terephthalate, polytrimethylene terephthalate, polybutylene terephthalate, polyhexamethylene terephthalate; polyethylene-2,6-naphthalate, polytrimethylene-2,6-naphthalate, polybutylene-2,6-naphthalate, polyhexamethylene-2,6-naphthalate, polyethylene isophthalate, polytrimethylene isophthalate, polybutylene isophthalate, polyhexamethylene isophthalate, poly-1,4-cyclohexane-dimethanol terephthalate, and polybutylene adipate terephthalate. Among these, polyethylene terephthalate is preferably used. Herein, the term polyethylene terephthalate (hereinafter sometimes abbreviated as "PET") is used to inclusively mean a polyester principally comprising a terephthalic acid unit derived from terephthalic acid or an ester derivative thereof, and an ethylene glycol unit derived from ethylene glycol or an ester derivative thereof, wherein at most 10 mol. % of each unit can be replaced with another dicarboxylic acid, such as phthalic acid, isophthalic acid or naphthalene-2,6-dicarboxylic acid, or another diol such as diethylene glycol, or a hydroxycarboxylic acid, such as glycolic acid, lactic acid or hydroxybenzoic acid.

The aromatic polyester resin may preferably have an intrinsic viscosity (as a measure corresponding to a molecular weight) in the range of 0.6-2.0 dl/g, particularly 0.7-1.5 dl/g. Too low an intrinsic viscosity makes the shaping difficult, and too high an intrinsic viscosity results in generation of a large shearing heat.

In the present invention, among the above-mentioned aromatic polyester resins, one obtained by using a germanium compound (catalyst) is principally used. The germanium compound (catalyst) may preferably comprise an organic complex or oxide of germanium, particularly preferably an oxide. The germanium content in the aromatic polyester resin is usually at least 1 ppm and less than 1000 ppm. The use of a larger amount is liable to cause coloring and an increase in production cost of the resultant aromatic polyester resin. During the recycling process of an aromatic polyester resin shaped product, a small portion of aromatic polyester resin obtained by polymerization with another polymerization catalyst can possibly be incorporated but may be tolerated as far as it allows the reduction of gas generation during the melt-processing intended by the present invention.

Such polyethylene terephthalate obtained with a germanium compound (catalyst) (hereinafter sometimes abbreviated as "PET(Ge)") is also commercially available, and examples thereof include, e.g., "J125S" made by Mitsui Kagaku K.K., "WPTS" made by Kanebo Gohsen K.K., and "KS710B-4" made by K.K. Kuraray. These commercially available products can be used as they are in the present invention.

The resin composition of the present invention comprises the above-mentioned aromatic polyester resin obtained with germanium compound (catalyst), as a principal component, in an amount of 99-70 wt. parts, preferably 95-75 wt. parts. If used in excess of 99 wt. parts, it becomes difficult to attain the intended increase in gas-barrier property because the amount of the polyglycolic acid resin is decreased correspondingly. On the other hand, below 70 wt. parts so as to attain a corresponding increase of the polyglycolic acid resin amount, the decrease in moisture resistance of the resultant composition can be problematic.

(Polyglycolic Acid Resin)

The polyglycolic acid resin used in the present invention in combination with the above-mentioned aromatic polyester resin with germanium compound (catalyst) is a polyglycolic acid resin obtained by ring-opening polymerization of glycolide. As mentioned above, a polyglycolic acid resin obtained by polycondensation of glycolic acid cannot provide a desirably high molecular weight to provide the resultant resin composition with desired mechanical strength but is caused to involve increased residual terminal hydroxyl group and carboxyl group, which lead to a failure in accomplishing the object of the present invention, i.e., prevention of glycolide gas generation during the melt-processing together with the aromatic polyester resin. Particularly, it is preferred to use a polyglycolic acid resin having a terminal carboxylic acid concentration of at most 50 eq/ton, further preferably at most 30 eq/ton. In contrast thereto, polycondensation-type polyglycolic acid resin has a terminal carboxylic acid content on the order of 100-400 eq/ton.

The polyglycolic acid resin (hereinafter sometimes referred to as "PGA resin") used in the present invention may include: glycolic acid homopolymer (PGA) obtained by ring-opening polymerization of glycolide alone and consisting only of a recurring unit represented by —(O.CH$_2$.CO)— and also a ring-opening copolymer of glycolide with a cyclic co-monomer, such as lactides (cyclic dimer esters of hydroxycarboxylic acids other than glycolic acid) including lactide (cyclic dimer ester of lactic acid); ethylene oxalate (i.e., 1,4-dioxane-2,3-dione); lactones, such as β-propiolactone, β-butyrolactone, pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam. However, in order to impart a high level of gas-barrier property to the aromatic polyester resin, it is preferred to retain at least 70 wt. % of the above-mentioned glycolic acid recurring unit in the PGA resin, and PGA homopolymer is particularly preferred.

PGA should preferably have a molecular weight (in terms of Mw (weight-average molecular weight) based on polymethyl methacrylate as measured by GPC using hexafluoroisopropanol solvent; the same as hereinafter, unless otherwise specified) which is preferably larger than 100,000, particularly in the range of 120,000-500,000. If the molecular weight is not larger than it becomes difficult to provide a shaped product having a desired strength through the melt-kneading with the aromatic polyester resin. On the other hand, if the PGA resin has an excessively large molecular weight, the composition is liable to be colored because of much heat evolution due to the shearing in the melt-kneading. A melt-viscosity may be used as a measure of preferred molecular weight of the PGA resin. More specifically, the PGA resin may preferably exhibit a melt-viscosity of 100-20000 Pa·s, more preferably 100-10000 Pa·s, particularly 200-2000 Pa·s as measured at 270° C. and a shearing speed of 122 sec$^{-1}$.

In the present invention, a PGA resin obtained through a process of subjecting glycolide (and also a small amount of another cyclic monomer, as desired) to ring-opening polymerization under heating, is used. The ring-opening polymerization is substantially a ring-opening polymerization according to bulk polymerization. The ring-opening polymerization is generally performed at a temperature of at least 100° C. in the presence of a catalyst. In order to suppress the lowering in molecular weight of the PGA resin during melt-kneading, it is preferred to suppress the residual glycolide content in the PGA resin used to below 0.5 wt. %, preferably below 0.2 wt. %, particularly below 0.1 wt. %. For this purpose, it is preferred to control the system at a temperature of below 190° C., more preferably 140-185° C., further preferably 160-180° C., so as to proceed with at least a terminal period (preferably a period of monomer conversion of at least 50%) of the polymerization in a solid phase as disclosed in WO2005/090438A, and it is also preferred to subject the resultant polyglycolic acid to removal of residual glycolide by release to a gaseous phase. As the ring-opening polymerization catalyst, it is possible to use oxides, halides, carboxylic acid salts, alkoxides, etc., of tin, titanium, aluminum, antimony, zirconium, zinc, germanium, etc. Among these, it is particularly preferred to use a tin compound, especially tin chloride in view of polymerization activity and colorlessness. However, there has been still observed a tendency that as the residual tin (calculated as metal) content in the resultant PGA resin is increased, the glycolide gas generation during the melt-processing or later processing with the aromatic polyester resin is increased, so that the residual tin (as metal) content should preferably be at most 70 ppm (or at most ca. 100 ppm calculated as tin chloride).

The resin composition of the present invention is obtained by melt-kneading 99-70 wt. parts of the above-mentioned aromatic polyester resin obtained with the germanium compound (catalyst) and 1-30 wt. parts (providing a total of 100 wt. parts together with the aromatic polyester resin) of the PGA resin obtained by ring-opening polymerization. For the melt-kneading, a single-screw extruder and a twin screw extruder may preferably be used for a commercial use but a plastomill, a kneader, etc., may also be used. The melt-kneading temperature may generally be determined as a temperature above a higher one of the melting points of the two components to be melt-kneaded, i.e., the aromatic polyester resin and the polyglycolic acid resin. In view of the fact that the melting point of the aromatic polyester resin, particularly polyethylene terephthalate (PET), is ordinarily ca. 260° C. and that of PGA is ca. 220° C., a temperature of at least ca. 260° C. is generally adopted but it is preferred to adopt an optimum temperature based on the melting point of an aromatic polyester resin actually used. As a certain degree of heat evolution can occur accompanying the melt-kneading, it is possible correspondingly to set the temperature of the melt-kneading apparatus to the melting point or therebelow of the aromatic polyester resin. The melt-kneading temperature, preferably the extruder set temperature, may generally be in the range of 220-350° C., more preferably 240-330° C., further preferably 260-360° C. A temperature below 220° C. is insufficient or requires a long time for formation of a melt state and is further liable to be insufficient for development of barrier property of the resultant composition. On the other hand, a melt-kneading temperature in excess of 350° C. is liable to cause coloring or a lowering of barrier property due to occurrence of decomposition or side reactions.

The melt-kneading time should be sufficient for formation of a mixing state of both resin components while it may depend on the shape, position and rotation conditions of a screw in the stirring apparatus or extruder. It is ordinarily 30 sec. to 60 min., preferably 1-45 min., more preferably 1.5-30 min. Below 30 sec., a uniform mixing state cannot be formed due to insufficient melt-kneading, thus failing to develop barrier property. On the other hand, in excess of 60 min., the decomposition or side reaction is liable to occur, leading to insufficient development of barrier property and inferior appearance of a shaped product.

(Stabilizer)

Various stabilizers may be added, as desired, while it is not essential, as the stability of the composition during melt-processing including melt-kneading is improved due to the use of the aromatic polyester resin (Ge) and the PGA resin (ring-opening polymerization). A representative example of such optionally added stabilizers may be a metal-deactivating agent, specific examples of which may include: phosphorus-containing compounds, such as phosphoric acid, trimethyl phosphate, triphenyl phosphate, tetra-ethylanimoniumhydroxide-3,5-di-t-butyl-4-hydroxybenzylphosphoric acid diethyl ester (including "Irganox 1222" made by Ciba-Geigy A. G. as a commercially available example), calcium-diethylbis [[[3,5-bis(1,1-dimethyl)-4-hydroxyphenyl]-methyl] phosphate ("Irganox 1425WL"), tris (2,4-di-t-butylphenyl) phosphite ("Irganox 168"), and further phosphoric acid esters having a pentaerythritol skeleton, such as cyclic neopentane-tetra-il-bis (2,6-di-t-butyl-4-methylphenyl phosphite ("ADEKASTAB PEP-36", made by K.K. ADEKA); and phosphorus compounds having at least one hydroxyl group and at least one long-chain alkyl ester group, such as a nearly equi-molar mixture of mono- and di-stearyl phosphates ("ADEKASTAB AX-71"); hindered phenol compounds, such as tetrakis [methylene-3-(3,5'-di-t-butyl-4'-hydroxyphenyl) propionate-methane] ("Irganox 1010"); and compounds generally showing a deactivating action against polyester polymerization catalysts, inclusive of hydrazine compounds having a —CO—NHNH—CO unit, such as bis[2-(2-hydroxy-benzoyl)-hydrazine]dodecanoic acid and N,N'-bis[3-(3,5-di-tert-butyl-4-hydroxyphenyl)propionyl]hydrazine, and further triazole compounds, such as 3-(N-salicyloyl)amino-1,2,4-triazole.

Such a metal-deactivating agent may preferably be one which is mutually soluble in a molten state with or can be dissolved in either of the aromatic polyester resin and the PGA resin. As the melt-kneading temperature is relatively high, one having properties such as a high melting point and a high decomposition temperature, is preferably used. Such a metal-deactivating agent, when used, should be added in an amount of at most 500 mol %, with respect to a total amount of Ge contained in the aromatic polyester resin (Ge) and a metal (e.g., tin) contained in the PGA resin. When used in excess of the above limit, the decomposition is liable to occur, leading to inconveniences, such as coloring, lowering of barrier property and lowering of strength.

It is also possible to add a carbodiimide compound or oxazoline compound known as a moisture resistance-improving agent, in an amount of at most 1 wt. % of the PGA resin (ring-opening polymerization (ROP)).

In case where the aromatic polyester resin (Ge) and/or PGA resin (ROP) already contain the above-mentioned stabilizer, the resins can be used as they are, or an appropriate amount of the stabilizer may be added, as desired.

EXAMPLES

Hereinbelow, the present invention will be described more specifically based on Examples and Comparative Examples. The characteristic values described herein including the following Examples are based on those measured or evaluated according to the following methods.

[Melt Viscosity]

A polymer sample was placed in a drier at 120° C. and contacted with dry air to provide a moisture content below 50 ppm as measured by means of a Karl Fischer moisture meter equipped with a vaporizer ("CA-100" (Vaporizer: "VA-100")

made by Mitsubishi Kagaku K.K.). The sample was used for measurement of a melt viscosity.

<Melt Viscosity (MV) Measurement Conditions>

| | |
|---|---|
| Apparatus: | "CAPIROGRAPH 1-C", made by K.K. Toyo Seiki. |
| Capillary: | 1 mm dia. × 1 mm-L. |
| Temperature: | 270° C. (for PGA) and 280° C. (for PET and PET/PGA blend) |
| Shear rate: | 121 sec.$^{-1}$. |

[Intrinsic Viscosity]

A PET sample in an amorphous state was dissolved in phenol/1,1,2,2-tetrachloroethane and subjected to measurement of intrinsic viscosity (IV, unit: dl/g) by means of an Ubbelohde viscometer No. 1 (viscometer constant: 0.1173) according to JIS K7390.

[Molecular Weight]

Ca. 10 mg of each polymer sample was dissolved in 0.5 ml of high-grade dimethyl sulfoxide on an oil bath at 150° C. The solution was cooled by cold water, and a 5 mM-sodium trifluoroacetate solution in hexafluoroisopropanol (HFIP) was added to the solution up to a total volume of 10 ml. The solution was filtered through a 0.1 μm-membrane filter of PTFE and then injected into a gel permeation chromatography (GPC) apparatus to measure a weight-average molecular weight (Mw). Incidentally, the sample solution was injected into the GPC apparatus within 30 min. after the dissolution.

<GPC Measurement Conditions>

| | |
|---|---|
| Apparatus: | "Shodex-104", made by Showa Denko K.K. |
| Columns: | 2 columns of "HFIP-606M" connected in series with one pre-column of "HFIP-G". |
| Column temperature: | 40° C. |
| Fluent: | 5 mM-sodium trifluoroacetate solution in HFIP. |
| Flow rate: | 0.6 ml/min. |
| Detector: | RI (Differential refractive index detector) |
| Molecular weight calibration: | Performed by using 7 species of standard polymethyl methacrylate having different molecular weights. |

[Glycolide (GL) Content]

To ca. 100 mg of a PGA sample or a PET/PGA blend sample, 2 g of dimethyl sulfoxide containing 4-chlorobenzophenol at a concentration of 0.2 g/L was added, and the mixture was heated at 150° C. for ca. 5 min. to dissolve the sample, followed by cooling to room temperature and filtration. Then, 1 μL of the filtrate solution was injected into a gas chromatography apparatus to effect the measurement.

<Gas Chromatography Conditions>

| | |
|---|---|
| Apparatus: | "GC-2010" made by K.K. Shimadzu Seisakusho) |
| Column: | "TC-17" (0.25 mm in diameter × 30 mm in length). |
| Column temperature: | Held at 150° C. for 5 min., heated at 270° C. at a rate of 20° C./min. and then held at 270° C. for 3 min. |
| Gasification chamber temperature: | 180° C. |
| Detector: | FID (hydrogen flame ionization detector) at temperature of 300° C. |

[Gas Generation]

Gas generated from strands discharged out of an extruder die during melt-processing under no wind state was observed with eyes from a point of ca. 50 cm horizontally and laterally spaced apart from the die and evaluated according to the following standard.

A: A state where gas generation could not be recognized even by careful observation.

B: A state where slight gas generation could be recognized by careful observation.

C: A state where gas generation could be easily recognized.

[Oxygen Permeability]

A film sample was subjected to measurement under the conditions of 23° C. and a relative humidity of 90% by means of an oxygen permeability meter ("OX-TRAN100", made by Mocon Co.). The measurement result was recorded as an oxygen permeability normalized at a thickness of 20 μm in the unit of cc/m$^2$/day/atm.

[Catalyst Metal Content]

Ca. 0.5 g of a resin sample was decomposed in a wet state with 2.5 mL of conc. sulfuric acid and 2 mL of hydrogen peroxide aqueous solution and then diluted up to 50 mL to be analyzed by ICP-AES (inductively coupled plasma-atomic emission spectrometry).

[Carboxylic Acid Concentration]

Ca. 0.3 g of a PGA sample was accurately weighed and completely dissolved in 10 mL of high-grade dimethyl sulfoxide on an oil bath at 150° C. in ca. 3 min. To the solution, 2 drops of 0.1% Bromothymol Blue/methanol solution were added, and then 0.02-normal sodium hydroxide/benzyl alcohol solution was gradually added until a terminal point when the solution color changed from yellow to green by observation with eyes. From the amount of the solution added up to the terminal point, a carboxylic acid concentration was calculated in terms of equivalent per 1 t (ton) of PGA resin (eq/t).

[Polyglycolic Acid (PGA) Pulverizate Production Example]

Into a hermetically sealable vessel equipped with a jacket, 355 kg of glycolide (made by Kureha Corporation; impurity contents: glycolic acid 30 ppm, glycolic acid dimer 230 ppm, moisture 42 ppm) was added, and the vessel was hermetically sealed up. Under stirring, the contents were melted by heating up to 100° C. by circulation of steam to the jacket, thereby forming a uniform solution. To the solution under stirring, 10.7 g of tin dichloride dehydrate and 1220 g of 1-dodecyl alcohol were added.

While being held at a temperature of 100° C., the contents were transferred to plural tubes of metal (SUS304) and 24 mm in inner diameter held within a polymerization apparatus. The apparatus included a body installing the tubes and an upper plate, each equipped with a jacket allowing circulation of a heat medium oil thereinto. After the contents were transferred into the tubes, the upper plate was immediately affixed.

A heat medium oil at 170° C. was circulated to the jackets for the body and the upper plate, and this state was held for 7 hours. After the 7 hours, the heat medium oil was cooled to room temperature, the upper plate was removed, and the body was vertically rotated upside down to take out lumps of produced polyglycolic acid. The lumps were pulverized by a pulverizer and then dried at 120° C. overnight to obtain a PGA pulverizate. The PGA pulverizate exhibited a weight-average molecular weight (Mw) of 214,000 and a glycolide content of 0.1 wt. %.

[PGA Pellet Production Example]

To the PGA pulverizate obtained in the above Production Example, an almost equi-molar mixture of mono- and distearyl acid phosphates ("ADEKASTAB AX-71", made by K.K. ADEKA) as a metal deactivating agent was added in a proportion of 300 ppm with respect to the PGA pulverizate, and the resultant mixture was extruded through a twin-screw extruder to obtain PGA pellets. The thus-obtained PGA pellets were heat-treated at 200° C. for 9 hours in a drier with a nitrogen atmosphere.

The resultant PGA pellets exhibited a weight-average molecular weight of 215,000 and a glycolide content of 0.05 wt. %. The PGA pellets were used in the following Examples.

<Extrusion Conditions>
Extruder: "TEM-41SS", made by Toshiba Kikai K.K.
Temperature set: The sections C1-C10 disposed sequentially from the discharge position and the die were set to temperatures of 200° C., 230° C., 260° C., 270° C., 270° C., 270° C., 270° C., 250° C., 240° C., 230° C. and 230° C., respectively.

Example 1

95 wt. parts of polyethylene terephthalate (PET) pellets ("J125S", made by Mitsui Kagaku K.K.; germanium content; 28 ppm, antimony content; 0 ppm, in PET) and 5 wt. parts of the above PGA pulverizate, were uniformly blended in a dry state; and melt-processed through a twin-screw extruder equipped with a feeder ("LT-20", made by K.K. Toyo Seiki) under the condition of residence time in the extruder of 5 min. to obtain a pellet-form resin composition, while observing the gas generation at that time.

The thus-obtained pellet-form resin composition was sandwiched with aluminum sheets and placed on a heat press machine at 270° C., followed by heating for 3 min. and pressing under 5 MPa for 1 min. Immediately thereafter, the sandwich was transferred to a water-circulated press machine and held under a pressure of 5 MPa for ca. 3 min. to obtain an amorphous press sheet.

The thus-obtained press sheet was fixed on a frame, held at 100° C. for 1 min. and then subjected to simultaneous biaxial stretching at 3×3 times longitudinally and laterally, thereby obtaining a stretched film.

(Extrusion Conditions)

| Temperatures: | C1: 250° C., C2: 290° C., C3: 290° C., die: 290° C. |
| --- | --- |
| Screw rotation speed: | 30 rpm. |
| Feeder rotation speed: | 20 rpm. |
| Residence time in the extruder: | 5 min. |

Example 2

90 wt. parts of PET pellets ("J125S", made by Mitsui Kagaku K.K.) and 10 wt. parts of the above-obtained PGA pulverizate were uniformly blended in a dry state, and the mixture was formed into a pellet-form resin composition and a stretched film in the same manner as in Example 1. During the melt-processing in the twin extruder for the pellet formation, gas generation was evaluated.

Example 3

75 wt. parts of PET pellets ("J125S", made by Mitsui Kagaku K.K.) and 25 wt. parts of the above-obtained PGA pulverizate were uniformly blended in a dry state, and the mixture was formed into a pellet-form resin composition and a stretched film in the same manner as in Example 1. During the melt-processing in the twin extruder for the pellet formation, gas generation was evaluated.

Comparative Example 1

95 wt. parts of PET pellets ("1101" made by KoSa Co.; antimony content 201 ppm, phosphorus content 8.1 ppm) and 5 wt. parts of the above-obtained PGA pulverized were uniformly blended in a dry state, and the mixture was melt-processed through a twin-screw extruder equipped with a feeder ("LT-20", made by K.K. Toyo Seiki) to obtain a pellet-form resin composition, and gas generation at that time was evaluated.

From the pellet-form resin composition, a stretched film was obtained in the same manner as in Example 1.

Comparative Example 2

90 wt. parts of PET pellets ("1101" made by KoSa Co.; antimony content 201 ppm, phosphorus content 8.1 ppm) and 10 wt. parts of the above-obtained PGA pulverized were uniformly blended in a dry state, and the mixture was formed into a pellet-form resin composition and a stretched film in the same manner as in Comparative Example 1. During the melt-processing by the twin extruder, gas generation was evaluated.

Comparative Example 3

75 wt. parts of PET pellets ("1101" made by KoSa Co.; antimony content 201 ppm, phosphorus content 8.1 ppm) and 125 wt. parts of the above-obtained PGA pulverized were uniformly blended in a dry state, and the mixture was formed into a pellet-form resin composition and a stretched film in the same manner as in Comparative Example 1. During the melt-processing by the twin extruder, gas generation was evaluated.

Example 4

A pellet-form resin composition and a stretched film were obtained in the same manner as in Example 1 except for using the PGA pellet produced in the above Production Example instead of the PGA pulverizate. During the melt-processing by the twin extruder, gas generation was evaluated.

Example 5

A pellet-form resin composition and a stretched film were obtained in the same manner as in Example 2 except for using the PGA pellet produced in the above Production Example instead of the PGA pulverizate. During the melt-processing by the twin extruder, gas generation was evaluated.

Example 6

A pellet-form resin composition and a stretched film were obtained in the same manner as in Example 3 except for using the PGA pellet produced in the above Production Example instead of the PGA pulverizate. During the melt-processing by the twin extruder, gas generation was evaluated.

Example 7

A pellet-form resin composition and a stretched film were obtained in the same manner as in Example 4 except that 200 ppm of germanium dioxide ("4N" made by Kanto Kagaku K.K.) was added with respect to the PET pellets at the time of uniform mixing of the PET pellets and the PGA pellets and the resultant mixture was melt-processed through the twin-screw extruder equipped with a feeder ("LT-20", made by K.K. Toyo Seiki). During the melt-processing by the twin extruder, gas generation was evaluated.

Example 8

A pellet-form resin composition and a stretched film were obtained in the same manner as in Example 4 except that 600 ppm of germanium dioxide ("4N" made by Kanto Kagaku K.K.) was added with respect to the PET pellets at the time of uniform mixing of the PET pellets and the PGA pellets and the resultant mixture was melt-processed through the twin-screw extruder equipped with a feeder ("LT-20", made by K.K. Toyo Seiki). During the melt-processing by the twin extruder, gas generation was evaluated.

Example 9

A pellet-form resin composition and a stretched film were obtained in the same manner as in Example 4 except that 1000 ppm of germanium dioxide ("4N" made by Kanto Kagaku K.K.) was added with respect to the PET pellets at the time of uniform mixing of the PET pellets and the PGA pellets and the resultant mixture was melt-processed through the twin-screw extruder equipped with a feeder ("LT-20", made by K.K. Toyo Seiki). During the melt-processing by the twin extruder, gas generation was evaluated.

Comparative Example 4

95 wt. parts of PET pellets ("1101" made by KoSa Co.; antimony content 201 ppm, phosphorus content 8.1 ppm), 5 wt. parts of the above PGA pellets and further 1000 ppm with respect to the PET pellets of antimony trioxide (made by Wako Jun'yaku Kogyo K.K.) were uniformly blended in a dry state, and the mixture was formed into a pellet-form resin composition by melt-processing by the twin-screw extruder equipped with a feeder ("LT-20", made by K.K. Toyo Seiki), while gas generation was evaluated.

From the resultant pellet-form resin composition, a stretched film was obtained in same manner as in Comparative Example 1.

Example 10

95 wt. parts of PET ("WPTS" made by Kanebo Gohsen K.K.; germanium content 31 ppm) and 5 wt. parts of the above PGA pellets were uniformly blended in a dry state, and a pellet-form resin composition and a stretch film obtained from the resultant mixture in the same manner as in Example 4. During the melt-processing by the twin-screw extruder, gas generation was evaluated.

Example 11

90 wt. parts of PET ("WPTS" made by Kanebo Gohsen K.K.; germanium content 31 ppm) and 10 wt. parts of the above PGA pellets were uniformly blended in a dry state, and a pellet-form resin composition and a stretch film obtained from the resultant mixture in the same manner as in Example 4. During the melt-processing by the twin-screw extruder, gas generation was evaluated.

Example 12

75 wt. parts of PET ("WPTS" made by Kanebo Gohsen K.K.; germanium content 31 ppm) and 25 wt. parts of the above PGA pellets were uniformly blended in a dry state, and a pellet-form resin composition and a stretch film obtained from the resultant mixture in the same manner as in Example 4. During the melt-processing by the twin-screw extruder, gas generation was evaluated.

Example 13

95 wt. parts of PET ("KS710B-4" made by K.K. Kuraray; germanium content 30 ppm) and 5 wt. parts of the above PGA pellets were uniformly blended in a dry state, and a pellet-form resin composition and a stretch film obtained from the resultant mixture in the same manner as in Example 4. During the melt-processing by the twin-screw extruder, gas generation was evaluated.

General features and evaluation results of the resultant compositions are inclusively shown in the following Table 1.

TABLE 1

| | | | Example | | | | | | | | |
|---|---|---|---|---|---|---|---|---|---|---|---|
| | | | 1 | 2 | 3 | Comp. 1 | Comp. 2 | Comp3 | 4 | 5 | 6 |
| Composition | PGA | | pulv. | pulv. | pulv. | pulv. | pulv. | pulv. | pellets | pellets | pellets |
| | PET | | PET(Ge) | PET(Ge) | PET(Ge) | PET(Sb) | PET(Sb) | PET(Sb) | PET(Ge) | PET(Ge) | PET(Ge) |
| | PET/PGA | | 95/5 | 90/10 | 75/25 | 95/5 | 90/10 | 75/25 | 95/5 | 90/10 | 75/25 |
| | PGA | | | | | | | | | | |
| | moisture | ppm | | | | 31 | | | | 5 | |
| | MV | Pa·s | | | | 386 | | | | 362 | |
| | Mw | — | | | | 214,000 | | | | 215,000 | |
| | GL content | % | | | | 0.10 | | | | 0.05 | |
| | carboxylic acid conc. | eq./t | | | | 19 | | | | 19 | |
| | metal deactivation agent | ppm | | | | 0 | | | | 300 | |
| | PET | | | J125S | | | KOSA1101 | | | J125S | |
| | metal element | | | Ge | | | Sb | | | Ge | |
| | | ppm | | 28 | | | 201 | | | 28 | |
| | IV | | | 0.74 | | | 0.847 | | | 0.74 | |
| | Mw | | | 22,000 | | | 18,000 | | | 22,000 | |
| | MV | | | 413 | | | 345 | | | 413 | |
| Blend state | Temp. | °C. | 290 | 290 | 290 | 290 | 290 | 290 | 290 | 290 | 290 |
| | residence time | min | 5 | 5 | 5 | 5 | 5 | 5 | 5 | 5 | 5 |
| | gas generation | | A | A | A | C | C | C | A | A | A |
| | $O_2$ permeability | * | 62 | 50 | 15 | 66 | 55 | 18 | 63 | 48 | 13 |
| | GL/composition | % | 0.020 | 0.038 | 0.05 | 0.397 | 0.582 | 0.9 | 0 | 0 | 0.01 |
| | GL/PGA | % | 0.40 | 0.38 | 0.20 | 7.94 | 5.82 | 3.6 | 0 | 0 | 0.04 |
| | Mw | | 26000 | 34000 | 41000 | 29000 | 34000 | 44000 | 27000 | 34000 | 40000 |
| | MV | | 289 | 280 | 257 | 242 | 238 | 220 | 302 | 307 | 323 |

TABLE 1-continued

| | | | Example | | | | | | | |
|---|---|---|---|---|---|---|---|---|---|---|
| | | | 7 | 8 | 9 | Comp. 4 | 10 | 11 | 12 | 13 |
| Composition | PGA | | pellets | pellets | pellets | pellets | pellets | pellets | pellets | pellets |
| | PET | | PET(Ge) | PET(Ge) | PET(Ge) | PET(Sb) | PET(Ge) | PET(Ge) | PET(Ge) | PET(Ge) |
| | PET/PGA | | 95/5 | 95/5 | 95/5 | 95/5 | 95/5 | 90/10 | 75/25 | 95/5 |
| | PGA | | | | | | | | | |
| | moisture | ppm | | | 5 | | | 5 | | 5 |
| | MV | Pa·s | | | 362 | | | 362 | | 562 |
| | Mw | — | | | 215,000 | | | 215,000 | | 215,000 |
| | GL content | % | | | 0.05 | | | 0.05 | | 0.05 |
| | carboxylic acid conc. | eq./t | | | 19 | | | 19 | | 19 |
| | metal deactivation agent | ppm | | | 300 | | | 300 | | 300 |
| | PET | | | J125S | | KOSA1101 | | WPTS | | KS710B-4 |
| | metal element | | | Ge | | Sb | | Ge | | Ge |
| | | ppm | 140 | 420 | 700 | 840 | | 31 | | 30 |
| | IV | | | 0.74 | | 0.847 | | | | |
| | Mw | | | 22,000 | | 18,000 | | 15000 | | 42,000 |
| | MV | | | 413 | | 345 | | 199 | | 2,200 |
| Blend state | Temp. | °C. | 290 | 290 | 290 | 290 | 290 | 290 | 290 | 290 |
| | residence time | min | 5 | 5 | 5 | 5 | 5 | 5 | 5 | 5 |
| | gas generation | | A | A | A | C | A | A | A | A |
| | O$_2$ permeability | * | 65 | 65 | 65 | 88 | — | — | — | — |
| | GL/composition | % | 0 | 0 | 0 | 0.082 | 0 | 0 | 0.01 | 0.01 |
| | GL/PGA | % | 0 | 0 | 0 | 1.64 | 0 | 0 | 0.04 | 0.20 |
| | Mw | | 26,000 | 26,000 | 24,000 | 29,000 | 21000 | 30000 | 59000 | 47,000 |
| | MV | | 290 | 286 | 262 | 230 | 154 | 167 | 205 | 2500 |

* O$_2$ permeability, units: cc/m$^2$/day/atm@20 μm

INDUSTRIAL APPLICABILITY

As shown in the above table, in the case where PET (Ge) and PGA (ring-opening polymerization) were melt-kneaded according to the present invention, glycolide gas generation was effectively prevented without further addition of a stabilizer to provide PET/PGA blends which exhibited a reduced residual glycolide content of less than 0.08 wt. %, particularly at most 0.05 wt. %, in addition to good gas-barrier property.

The invention claimed is:

1. An aromatic polyester resin composition, comprising: a melt-kneaded product of 99-70 wt. parts of an aromatic polyester resin and 1-30 wt. parts (providing a total of 100 wt. parts together with the aromatic polyester resin) of a polyglycolic acid resin,
    wherein the aromatic polyester resin is an aromatic polyester resin polymerized with a germanium compound (catalyst), and the polyglycolic acid resin is a polyglycolic acid resin obtained by ring-opening polymerization of glycolide, and
    wherein the composition contains less than 0.08 wt % of glycolide and 1-1000 ppm of germanium (as metal).

2. The composition according to claim 1, wherein the polyglycolic acid resin contains less than 50 eq/ton of terminal carboxylic acid.

3. The composition according to claim 1, containing at most 70 ppm of catalyst tin (as metal) with respect to the polyglycolic acid resin.

4. The composition according to claim 1, containing a metal-deactivating agent comprising a phosphorous compound or a hydrazine compound.

* * * * *